UNITED STATES PATENT OFFICE.

WILHELM SCHUMACHER, OF OSNABRÜCK, GERMANY, ASSIGNOR TO ERNST THALMANN, OF NEW YORK, N. Y.

PROCESS OF AGGLOMERATING MATERIALS.

No. 859,411.      Specification of Letters Patent.      Patented July 9, 1907.

Application filed December 26, 1906. Serial No. 349,486.

*To all whom it may concern:*

Be it known that I, WILHELM SCHUMACHER, a subject of the Emperor of Germany, and a resident of Osnabrück, Germany, have invented certain new and useful Improvements in Processes for Agglomerating Materials, of which the following is a specification.

My invention relates to the preparation of a very effective binder for agglomerating comminuted or pulverulent substances, particularly ores, blast furnace dust, and the like, so as to form such substances into coherent masses or bodies.

I have heretofore secured British Letters Patent No. 28,019 of December 21st, 1904, setting forth a process in which very finely ground silicious material is mixed with lime and with the substance to be agglomerated, and thereupon exposed to the action of steam under pressure. I have discovered that results of an exceedingly efficient character are obtained if the silicious material and the lime are ground together so that the silicious material in being broken up will also exert a grinding action upon the lime and the small particles of silicious material which are the result of the operation will be covered with lime dust, and, as it were, enveloped therein so that a very energetic re-action will occur when the mixture is thereafter exposed to the influence of steam.

In detail I may proceed as follows: I take a suitable silicious material such as sand, quartz or flint, and a suitable amount of lime, which term I desire to be understood in the commercial sense so as to include both material which contains only calcium compounds, and also material which in addition contains magnesium compounds; as equivalents of lime, I may employ compounds or mixtures containing lime in sufficient amount, for instance Portland cement or basic blast furnace slag. These two materials, (that is, the silicious material and lime) I employ in approximately equal proportions of $CaO$ and $SiO_2$ and grind them together. The result of the grinding operation, so far as the silicious material is concerned, is to break it up into flakes, needles and other pieces of irregular shape having a very large surface, in fact, a larger surface than particles of sand as found in nature which have the same degree of fineness, that is, which will pass through sieves of the same mesh. This breaking up of the silicious material into very small particles of irregular shape as distinguished from the approximately globular shape which even fine sand particles have in nature, promotes the re-action taking place later on, by very largely increasing the surface of the particles of silicious material while at the same time reducing their thickness. By grinding the silicious material together with the lime I not only secure a very intimate mixture of the two ingredients which in itself will promote a thorough re-action, but furthermore, the irregular pieces of silicious material produced by the grinding operation, themselves exert a very effective grinding action upon the lime and convert it into a very fine powder which adheres to the particles of silicious material, especially as the irregular surface of the latter offers many cracks and angles in which such lime dust may lodge. Each of the particles of silicious material therefore becomes coated with lime dust and many of them are actually enveloped in lime dust.

Having thus produced a very intimate mixture of finely ground silicious material and pulverulent lime, I mix this with the material to be agglomerated, such as fine ores, blast furnace dust and the like, the proportion varying, but in any event, the material to be agglomerated forms the bulk of the mixture. As a rule the admixture of the silicious material-lime compound will be about 5% of the dust or powder to be agglomerated. If the ore dust or other material to be agglomerated does not contain a sufficient amount of moisture, water, or its equivalent, is added, and the mixture having been preliminarily formed into coherent masses, as by briquetting it in suitable presses, is brought into a closed vessel where it is subjected to the action of steam and of pressure.

The steam and the pressure causes the silicious material and the lime to combine, forming silicates which act as efficient binders to hold the coherent bodies together so that they may be afterwards shipped and exposed to heat in a furnace without danger of premature crumbling. The efficiency of the process is tested by the completeness of the conversion of the silicious material into silicates, and I have found that when proceeding as above described, a remarkably small percentage of the silicious material remains unaltered. This I explain by the fact that, as above set forth, the silicious material and the lime are very intimately mixed, and that each particle of silicious material is of an irregular shape which not only promotes the re-action by affording a very large surface, but causes particles of the lime dust to be retained in the cracks and angles which are formed in the silicious material during grinding, the grinding operation not only bringing the two ingredients together and causing lime dust to cover and even to envelop the particles of silicious material, but actually forcing the lime dust into the cracks of such silicious material.

I might also, after grinding the silicious material together with the lime, first subject the resulting mixture to the action of steam under pressure, so as to produce a partial conversion into silicate, and then after mixing the resulting mass with the ore or other substance to be agglomerated, again subject the material to the action of steam under pressure.

I claim as my invention:

1. The process for agglomerating comminuted materials, which consists in grinding together silicious material and lime with approximately equal proportions of CaO and $SiO_2$ to very great fineness, so as to split up the silicious material into particles of irregular shape coated with lime dust, incorporating the mixture with the material to be agglomerated and with moisture, and exposing the mass to the action of steam under pressure.

In testimony whereof, I have hereunto signed my name in the presence of two subscribing witnesses:

WILHELM SCHUMACHER.

Witnesses:
JOHN LOTKA,
JOHN A. KEHLENBECK.